April 9, 1935.　　J. H. FLEAGLE　　1,997,253
VEHICLE BRAKE
Filed April 17, 1934　　3 Sheets-Sheet 1
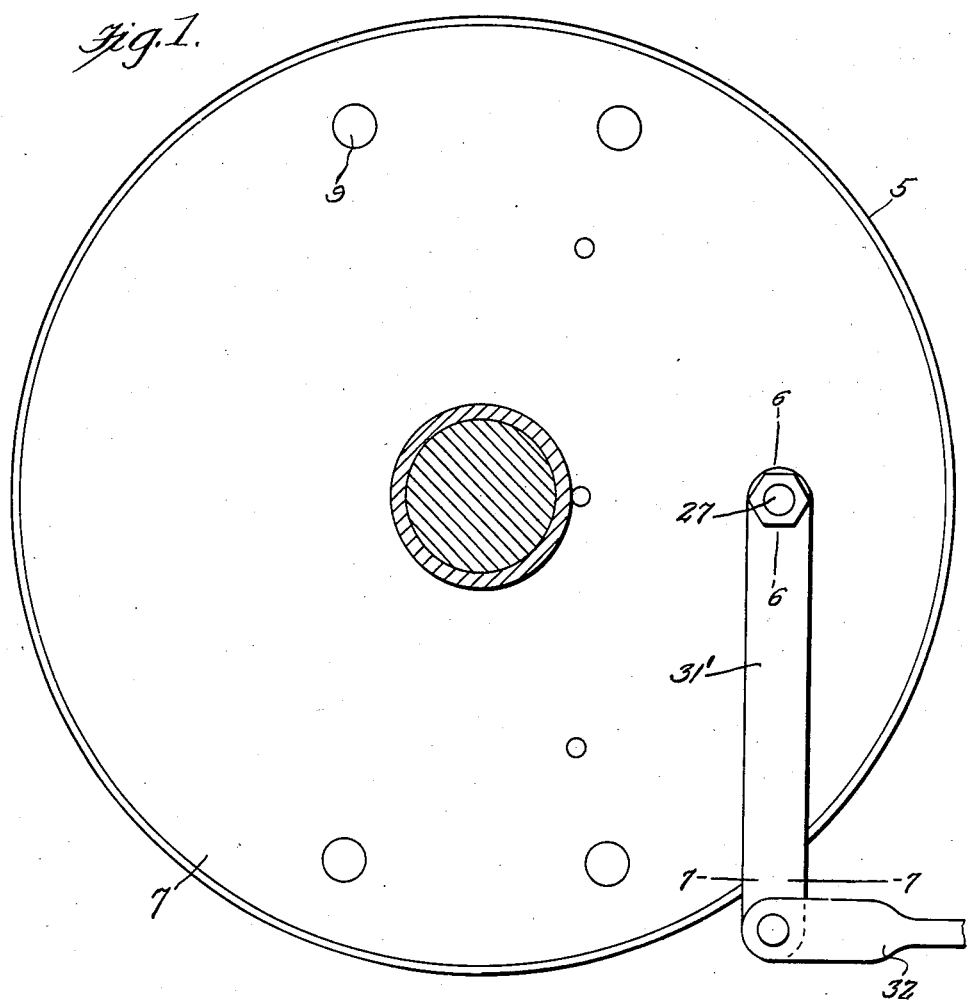
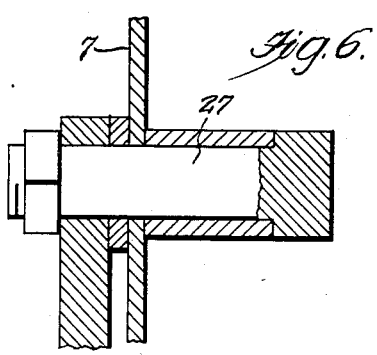
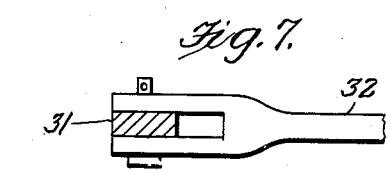
Inventor
James H. Fleagle,
By *Clarence A. O'Brien*
Attorney April 9, 1935.　　　J. H. FLEAGLE　　　1,997,253
VEHICLE BRAKE
Filed April 17, 1934　　　3 Sheets-Sheet 2
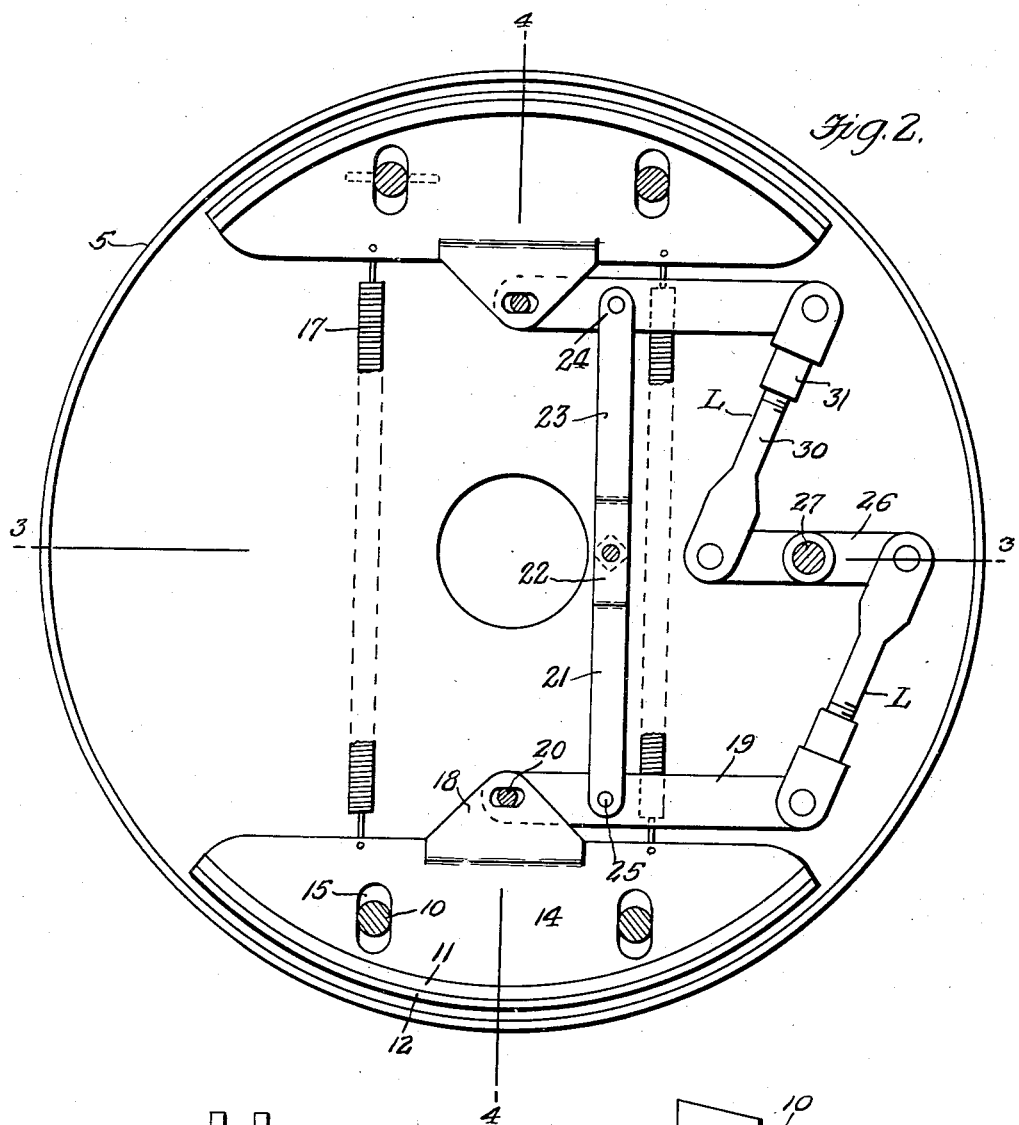
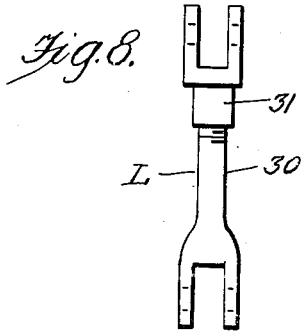
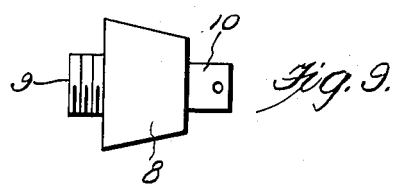
Inventor
James H. Fleagle,
By Clarence A. O'Brien
Attorney April 9, 1935.　　　　J. H. FLEAGLE　　　　1,997,253
VEHICLE BRAKE
Filed April 17, 1934　　　3 Sheets-Sheet 3
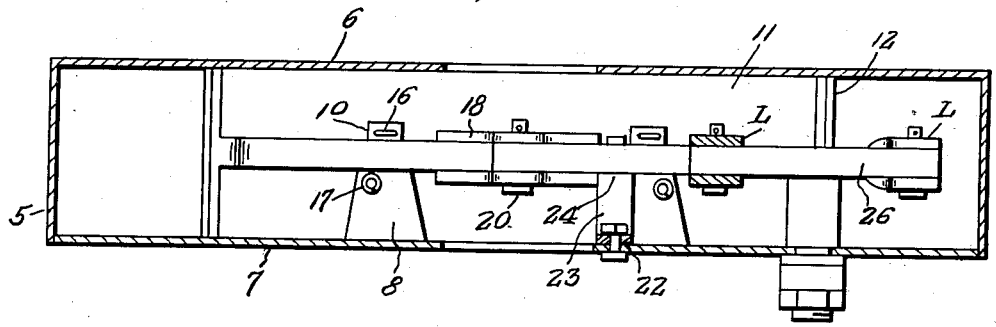
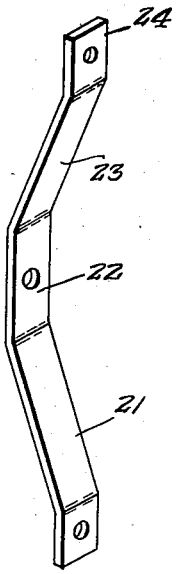
Inventor
James H. Fleagle,
By Clarence A. O'Brien
Attorney Patented Apr. 9, 1935

1,997,253

UNITED STATES PATENT OFFICE 1,997,253

VEHICLE BRAKE

James H. Fleagle, Seattle, Wash.

Application April 17, 1934, Serial No. 721,037

3 Claims. (Cl. 188—78)

The present invention relates to a vehicle brake designed particularly for use on automobiles.

An important object of the invention resides in the provision of a brake structure which will provide even wear, and eliminate drag.

Another important object of the invention resides in the provision of a brake structure of this nature which is simple, comparatively inexpensive to manufacture, the parts of which are easy to assemble and disassemble, easy to reline, thoroughly efficient and reliable in use and operation and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a side elevation of a brake embodying the features of my invention.

Figure 2 is a sectional view showing the stationary plate removed.

Figure 3 is a sectional view taken substantially on the line 3—3 of Figure 2.

Figure 4 is a sectional view taken substantially on the line 4—4 of Figure 2.

Figure 5 is a perspective view of a bracket.

Figure 6 is a detail sectional view taken substantially on the line 6—6 of Figure 1.

Figure 7 is a detail sectional view taken substantially on the line 7—7 of Figure 1.

Figure 8 is a detail view of one of the adjustable links, and

Figure 9 is a detail view of one of the studs.

Referring to the drawings in detail it will be seen that numeral 5 denotes a drum formed integrally on a plate 6. Numeral 7 denotes the stationary plate. There are four studs S arranged in pairs, one pair at the top of the plate 7 and the other pair at the bottom thereof. Each stud as shown to advantage in Figure 9 comprises a tapering body 8 with a threaded shank 9 at one end to engage in an opening in the plate 7 and at the other end a pin 10. Numerals 11 denote the two arcuate shoes with brake linings 12 thereon. From the central intermediate portions of these shoes extend webs 14. Each web 14 has a pair of slots 15 through which the pins 10 of the studs S project. Cotter pins 16 extend through openings in the pins 10. Springs 17 connect the webs and are tensioned to normally hold the brake shoes in released position. Projecting inwardly from each web 14 is a pair of ears 18. Levers 19 have pin and slot connections 20 with these ears 18. A bracket 21 has a central offset portion 22 fixed to the plate 7 and connected by portions 23 with ends 24 on which intermediate portions of the lever 19 are pivotally mounted as at 25. A lever 26 is fixed intermediate its ends on a shaft 27 journalled through the plate 7 as shown to advantage in Figure 6.

Links L are pivotally engaged with opposed ends of the lever 26 and with the levers 19. These lugs are adjustable, each comprising a shank 30 having a portion 31 threadedly engaged thereon so that the length of the link may be adjusted thereby adjusting the brake. A crank 31' is fixed on the shaft 27 for actuation thereof. A suitable link connection 32 engages with the lever 32 and leads to the usual foot pedal.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a brake construction, a drum, a plate associated with the drum, two pairs of studs projecting from the plate interiorly of the drum, the pairs being located at opposite sides of the plate, a pair of arcuate shoes inside the drum and having intermediate their edges inwardly directed webs provided with slots through which portions of the studs extend, spring means associated with the webs for holding the brake shoes in released position, and means operatively connected with the webs whereby the brake shoes may be moved outwardly to engage interiorly with the drum, said means comprising a pair of ears projecting inwardly from each web, levers pivotally engaged between the ears, a bracket fixed to the plate and pivotally connected at its ends with intermediate portions of the levers, and means for swinging the levers.

2. In a brake construction, a drum, a plate associated with the drum, two pairs of studs projecting from the plate interiorly of the drum, the pairs being located at opposite sides of the plate, a pair of arcuate shoes inside the drum and having inwardly directed webs provided with slots through which portions of the studs extend, spring means associated with the webs for holding the brake shoes in released position, and means operatively connected with the webs whereby the brake shoes may be moved outwardly to engage interiorly with the drum, said means comprising a pair of ears projecting inwardly from each web, levers pivotally engaged between the ears, a bracket fixed to the plate and pivotally connected at its ends with intermediate portions of the levers, adjustable links connected with the levers, a shaft, a crank lever on the shaft intermediate its ends and having its ends pivotally engaged with said links.

3. In a brake construction, a drum, a plate associated with the drum, two pairs of studs projecting from the plate interiorly of the drum, the pairs being located at opposite sides of the plate, a pair of arcuate shoes inside the drum and having intermediate their edges inwardly directed webs provided with slots through which portions of the studs extend, spring means associated with the webs for holding the brake shoes in released position, and means operatively connected with the webs whereby the brake shoes may be moved outwardly to engage interiorly of the drum, levers, and means pivotally engaging the levers with the ears, a bracket fixed to the plate and pivotally connected at its ends with intermediate portions of the levers, adjustable links connected with the levers, a shaft, a crank lever on the shaft intermediate its ends and having its ends pivotally engaged with said links.

JAMES H. FLEAGLE.